(12) United States Patent
Jolly et al.

(10) Patent No.: US 7,442,883 B2
(45) Date of Patent: Oct. 28, 2008

(54) POKE-THROUGH FLOOR DEVICE WITH HEAT-ISOLATION FEATURE

(75) Inventors: Robert K. Jolly, Cordova, TN (US); Mark R. Drane, Germantown, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/781,324

(22) Filed: Jul. 23, 2007

(65) Prior Publication Data
US 2008/0087462 A1 Apr. 17, 2008

Related U.S. Application Data

(60) Provisional application No. 60/829,160, filed on Oct. 12, 2006.

(51) Int. Cl.
*H02G 3/04* (2006.01)
(52) U.S. Cl. .................. 174/483; 174/485; 174/486; 439/538; 52/220.8
(58) Field of Classification Search .............. 174/57.67, 174/50, 53, 58, 480–490; 439/538, 536, 439/650, 135, 142, 141, 535; 52/220.5, 220.7, 52/220.8; 220/3.3, 3.5–3.8; D13/137, 143, D13/146, 152; 248/906
See application file for complete search history.

(56) References Cited

U.S. PATENT DOCUMENTS

| | | | |
|---|---|---|---|
| 4,099,020 A | 7/1978 | Kohaut | |
| 4,243,835 A | 1/1981 | Ehrenfels | |
| 4,264,779 A | 4/1981 | Rhodes et al. | |
| 4,272,643 A | 6/1981 | Carroll et al. | |
| 4,477,694 A | 10/1984 | Kohaut | |
| 4,572,923 A | 2/1986 | Castellani et al. | |
| 4,573,297 A * | 3/1986 | Benscoter et al. | 52/220.8 |
| RE32,678 E | 5/1988 | Benscoter et al. | |
| 4,770,643 A * | 9/1988 | Castellani et al. | 439/135 |
| 5,032,690 A * | 7/1991 | Bloom | 174/487 |
| 5,272,278 A * | 12/1993 | Wuertz | 174/484 |
| 5,393,930 A * | 2/1995 | Wuertz | 174/483 |
| 5,410,103 A * | 4/1995 | Wuertz | 174/483 |
| 5,641,940 A | 6/1997 | Whitehead | |
| 5,696,349 A | 12/1997 | Bera | |
| 5,747,732 A | 5/1998 | Bera et al. | |
| 5,814,764 A | 9/1998 | Kohaut | |
| 6,307,152 B1 * | 10/2001 | Bonilla et al. | 174/483 |
| 7,053,296 B2 * | 5/2006 | Drane et al. | 174/483 |
| 7,082,729 B2 * | 8/2006 | Cole et al. | 52/220.8 |
| 7,183,503 B2 * | 2/2007 | Bowman et al. | 174/483 |

* cited by examiner

*Primary Examiner*—Dhiru R Patel
(74) *Attorney, Agent, or Firm*—Hoffman & Baron, LLP

(57) ABSTRACT

A poke-through device for installation in a hole in a floor structure. The floor structure defined by a floor in a first working environment and a ceiling in a second working environment. The poke-through device includes a basket, thermal barrier, lower plate and at least one coupling member. The basket including a coupling support surface. The thermal barrier being disposed below the basket. The lower plate supporting the thermal barrier. Also, the at least one coupling member extending through the thermal barrier and securing the basket to the lower plate. The coupling member including an upper portion disposed within the basket. The upper portion including an undersurface, wherein a first portion of the undersurface is in direct contact with the support surface and a second portion of the undersurface does not directly engage the basket.

20 Claims, 4 Drawing Sheets

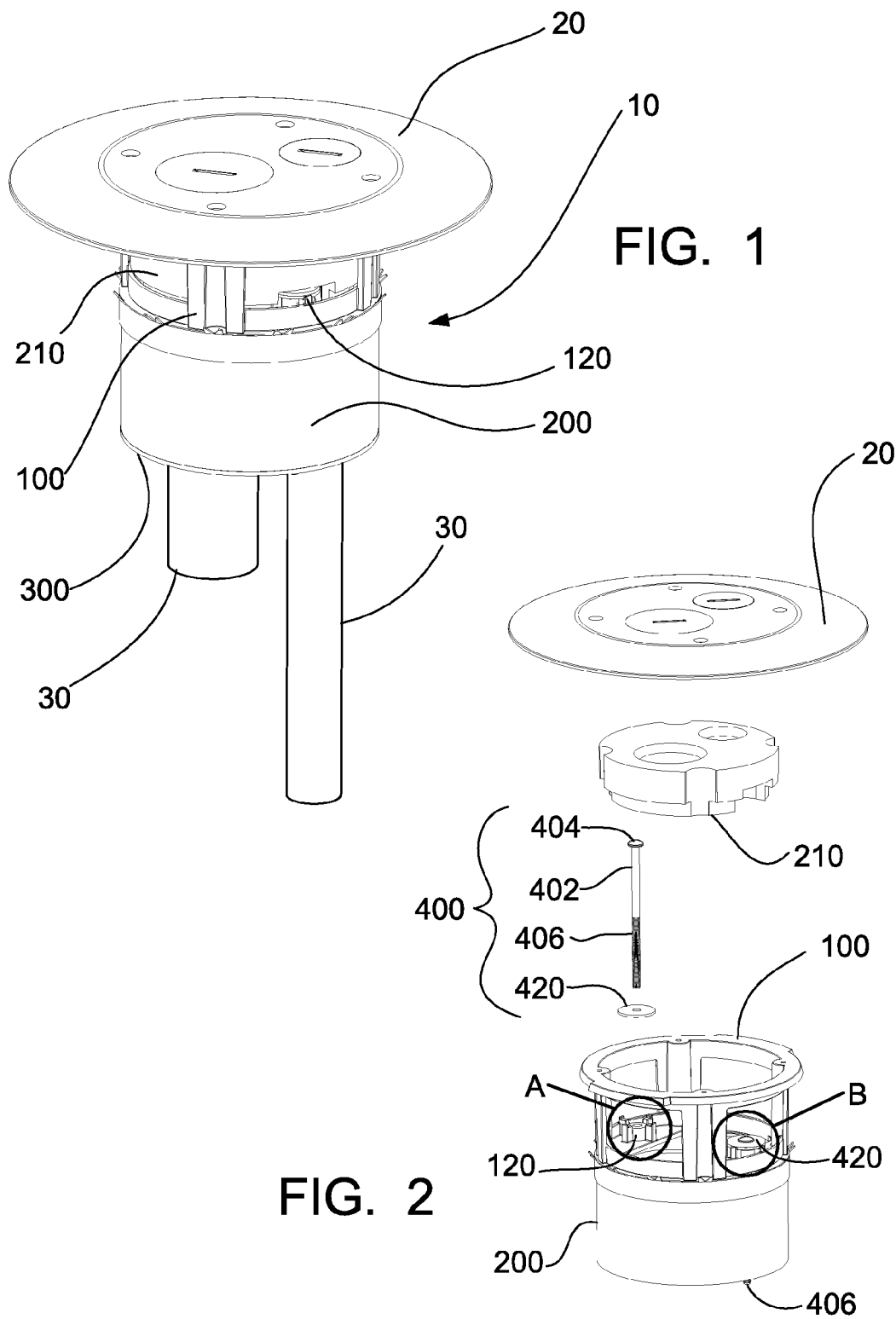

POKE-THROUGH FLOOR DEVICE WITH HEAT-ISOLATION FEATURE

CROSS-REFERENCE TO RELATED APPLICATIONS

This application claims the benefit of U.S. Provisional Patent Application Ser. No. 60/829,160 filed on Oct. 12, 2006.

BACKGROUND OF THE INVENTION

A poke-through device or simply a "poke-through" is a common device that enables power, data or other cabling to pass through a hole in a floor of a structure, generally a concrete floor. A thermal barrier in the form of a fire and/or smoke retardant element, particularly intumescent material, is incorporated within the poke-through to seal the floor opening in the event of a fire. This helps prevent a fire or the smoke from spreading from one floor to the next.

Contemporary poke-throughs provide access between an upper floor and an immediately adjacent lower floor. The poke-through assembly is usually installed with a cover which serves as a cap or lid for the hole. Also, the poke-through generally includes an upper frame or basket designed to create an easily accessible cavity or recess at the surface of the upper floor. Alternatively, such frames or baskets can be used to hold power and/or data receptacles therein. The upper frame is generally metallic and is in direct contact with a cover plate or the upper flooring itself. A lower end of the contemporary poke-through is connected to a junction box accessible to an adjacent lower floor. Intumescent material is generally used between the upper basket and the lower end. Also, the upper and lower portions of the poke-through are secured with a number of metallic bolts, screws or other fasteners that pass through the intervening intumescent material. However, the intumescent material does not provide a stable support structure, especially when heated substantially. Thus, the fasteners provide a more durable coupling for the upper and lower portions of the poke-through.

While the intumescent material acts well as a thermal barrier, the metallic fasteners pass through the thermal barrier and conduct heat to the upper portions of the poke-through. As the heads of the fasteners are generally in direct contact with the metallic upper basket, portions of the adjacent upper flooring can overheat from the conductive heat transfer.

There is therefore a need for a poke-through device that provides improved heat isolation features. Such heat isolation features preferably minimize and/or reduce conductive heat transfer within the poke-through that bypasses the traditional thermal barrier. Such improved heat isolation features must be inexpensive, manufactured easily and quickly installed. Additionally, it would be beneficial if the improved features could be retrofit into existing poke-throughs without replacing the entire assembly.

SUMMARY OF THE INVENTION

One aspect of the present invention provides a poke-through device for installation in a hole in a floor structure. The floor structure is defined by a floor in a first working environment and a ceiling in a second working environment. The poke-through device includes a basket, thermal barrier, lower plate and at least one coupling member. The basket includes a coupling support surface. The thermal barrier is disposed below the basket. Also, the at least one coupling member extends through the thermal barrier and secures the basket to the lower plate. The coupling member includes an upper portion disposed within the basket. The upper portion includes an undersurface, wherein a first portion of the undersurface is in direct contact with the support surface and a second portion of the undersurface does not directly engage the basket.

Another aspect of the present invention includes a poke-through device including a receptacle-receiving basket, an intumescent member, a base member and at least one fastener assembly. The receptacle-receiving basket includes a coupling bracket. The intumescent member is disposed below the basket. The base member supports the intumescent member. Also, the at least one fastener assembly extends through the intumescent member and secures the intumescent member between the basket and the base member. The fastener assembly includes an upper head disposed within the basket, wherein a first portion of the fastener assembly is in direct contact with the coupling bracket and a second portion of the fastener assembly does not directly engage the coupling bracket.

Additionally, the poke-through device of the present invention can have the coupling member include a head on at least one end and a dispersion plate disposed between the head and the support surface. The undersurface of the upper portion can be a downward facing surface of the dispersion plate. The dispersion plate can be formed of a ceramic-fiber washer. Also, coupling support surface can be an upper surface of at least one support member integrally formed with the basket. The support member can protrude upwardly toward the first working environment from a base of the basket. Also, the support member can protrude inwardly from an outer portion of the basket. Further, the support member can include a tab for holding the dispersion plate in a pre-selected position.

Further, the poke-through device can include a second thermal barrier disposed at least partially above the coupling member. The dispersion plate can be an annular washer. Also, the dispersion plate can be sized to conform to at least a portion of an inner peripheral surface of the basket. The basket can include ribs that interlock with the dispersion plate for positioning the dispersion plate.

Further still, the fastener assembly can include a dispersion plate disposed between the head and the coupling bracket. Also, the coupling bracket can include an upper surface for engaging the fastener assembly first portion. The coupling bracket can protrude upwardly toward the first working environment from a base of the basket. Also, the coupling bracket can protrude inwardly from an outer portion of the basket. The coupling bracket can further include a tab for holding the dispersion plate in a pre-selected position. The poke-through device can include an additional intumescent member disposed at least partially above the fastener assembly. Further, the dispersion plate can be an annular member. The basket can include ribs that interlock with the dispersion plate for positioning the dispersion plate.

These and other objects, features, and advantages of this invention will become apparent from the following detailed description of illustrative embodiments thereof, which is to be read in connection with the accompanying drawings.

BRIEF DESCRIPTION OF THE DRAWINGS

FIG. 1 is a top perspective assembled view of one embodiment of the poke-through assembly of the present invention with a cover assembly and conduit structures.

FIG. 2 is a top partially exploded perspective view of the poke-through assembly and cover assembly shown in FIG. 1, without the lower assembly.

DETAILED DESCRIPTION OF THE PREFERRED EMBODIMENTS

Figure 3:
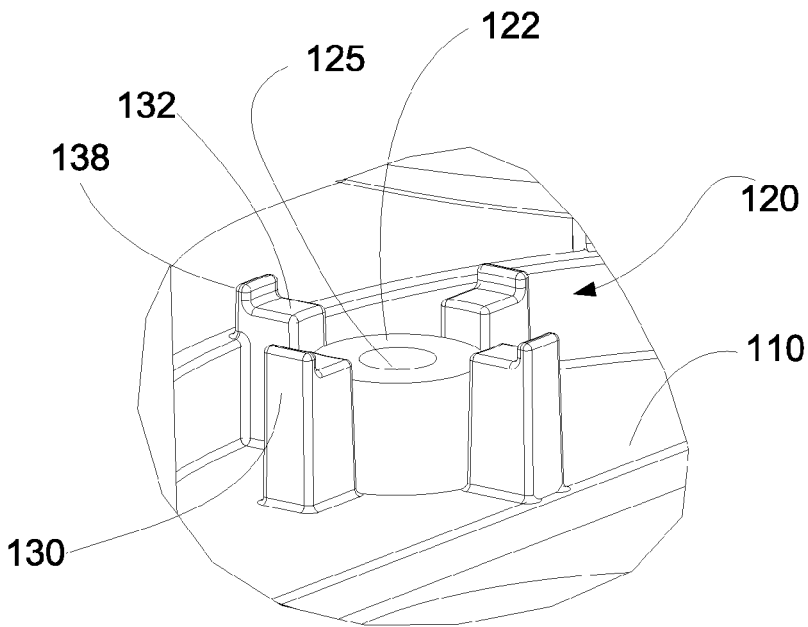
FIG. 3 is a top perspective relief view of a stand-off coupling mount shown at A in FIG. 2.

This invention pertains to a poke-through device that provides improved heat isolation features, particularly in the form of a stand-off coupling mount that improves heat isolation. Also, the features of the present invention are relatively inexpensive, manufactured easily and quickly installed. Additionally, the features of the present invention can be retrofit into existing poke throughs without replacing the entire assembly.

FIG. 1 shows a poke-through device 10 with a cover assembly 20 and lower conduit elements 30 secured thereto. As shown, the poke-through preferably includes a basket 100, a thermal barrier 200 and a lower end plate 300. Also shown are portions of the stand-off coupling mount 120 and an upper thermal barrier 210. The exploded view in FIG. 2 shows some additional elements of the assembly in FIG. 1. In particular, the basket 100 is shown unobstructed with the cover assembly 20, upper thermal barrier 210 and a coupling member 400 separated there from. Also, more clearly shown in FIG. 2 are two stand-off coupling mounts 120, preferably secured to a lower portion of the basket 100. The basket 100 preferably is made to receive one or more receptacles and associated connectors, components and supporting brackets. However, basket 100 can also be configured as a furniture feed, without receptacles, providing access between floors for cabling and/or conduit. While the basket 100 shown forms a cup-like member, with various openings and cutouts, it should be understood that this element could have many variations known in the art. For example, the peripheral side walls of the basket 100 need not be continuous, but preferably cover a substantial portion of the floor hole in which it is installed. Similarly, fewer or additional openings or cutouts could be provided and the basket 100 can have a non-cylindrical shape. Additionally, while the basket 100 can be made of various materials, it is preferably made of die-cast zinc or aluminum.

The poke-through also preferably includes at least one thermal barrier 200 in the form of a fire/smoke retardation or intumescent member. Thermal barrier 200 is bounded on its lower side by lower end plate 300 and on its upper side by the basket 100. The three components are preferably held together via at least one coupling member 400 as shown. The thermal barrier 200 is configured with a series of passageways therethrough (not shown). Larger and smaller openings pass vertically through the material for passing data, power or other cabling, as is known in the art. At least one of the small openings passing therethrough is occupied by a coupling member shaft 402. When the poke-through is assembled, preferably an additional upper thermal barrier 210 is contained above the coupling member and within the basket 100.

The coupling member 400, shown in FIG. 2, includes a screw or bolt with a central shaft 402, an upper head 404 and a lower threaded portion 406. Preferably a stainless steel screw is used, as such parts are readily available, very durable and relatively heat resistant as compared to other metals. However, it should be understood that although a common screw/bolt is shown in FIG. 2 a more unique fastener could be used for the coupling member 400. The coupling member 400 also includes a load/heat dispersion plate 420, that is sized to receive a central shaft 402 of the coupling member 400 and support the upper head 402.

Figure 4A:
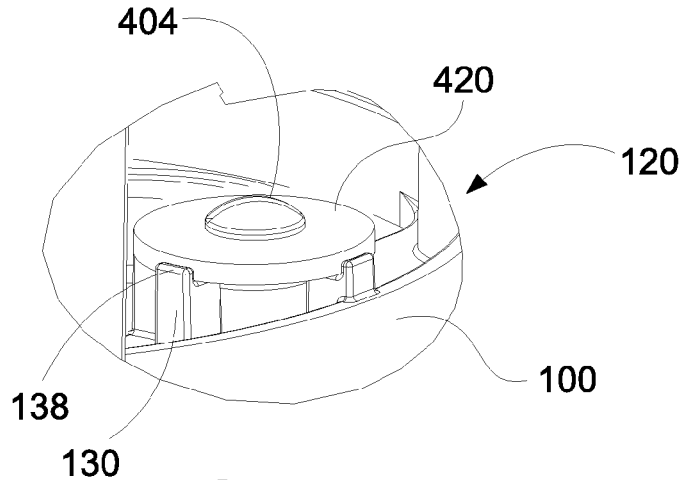
FIG. 4a is a top perspective relief view of a stand-off coupling mount assembled with a screw and washer, as shown at B in FIG. 2.
Figure 4B:
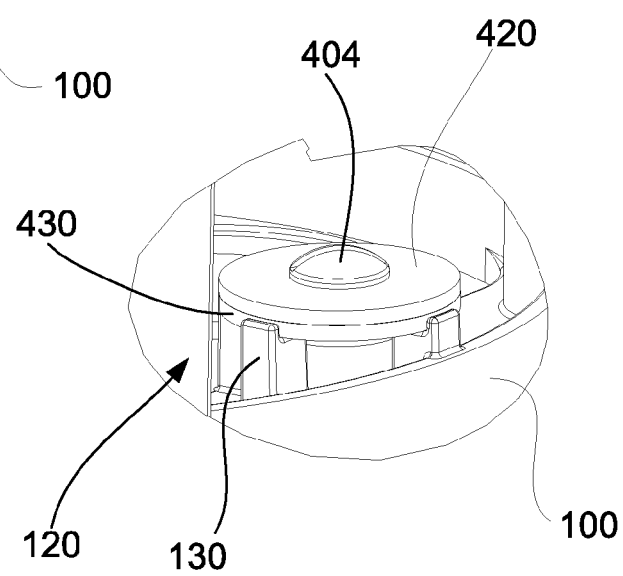
FIG. 4b is a top perspective relief view as shown in FIG. 4a, with an additional washer.

FIGS. 3, 4a and 4b show more detail, as indicated at A and B in FIG. 2, of the stand-off coupling mount 120 and its interaction with a coupling member 400. The coupling mount 120 is preferably located at a lower portion 110 of the basket 100. The coupling mount 120 includes a central aperture 125 for passage of the shaft 402. Also, the coupling preferably includes one or more stand-off posts 130 intended to support the coupling member 400. While the embodiment shown in FIGS. 3 and 4a show four stand-off posts 130, it should be understood that greater or fewer posts could be provided so long as the coupling member 400 is supported and sufficient thermal dissipation is provided. The upper portion of the stand-off posts 130 preferably includes a contact surface 132 intended to directly engage an underside or undersurface of an upper portion of the coupling member 400. Thus, as illustrated in FIGS. 4a and 4b, the undersurface of either the dispersion plate 420 in FIG. 4a or the additional plate or washer 430 in FIG. 4b directly engage the contact surface 132. The embodiments shown in FIGS. 3, 4a and 4b further include optional reinforcing and/or stabilizing features for the coupling mount 120. In particular, the central cylindrical boss 122, which is either integrally formed with or fixedly attached to the posts 130 provides support for the coupling mount. Also, the extension tabs 138 help position and stabilize the dispersion plate 420.

Thus, the coupling member shaft 402 passes through an aperture 125 in the basket 100. The head 404 of the coupling member sits on the dispersion plate 420, which in turn rests on either the stand-off contact surface 132 (FIG. 4a) or rests on washer 430 (FIG. 4b). In this way, the stand-off posts 130 support the dispersion plate 420 and/or the washer 430 with minimum surface contact between the metallic head 404 and the basket 100. This is intended to reduce the conductive heat transfer between those elements. In addition to potentially dispersing thermal energy conducted through the shaft 402 and head 404, the dispersion plate 420 also acts as a load dispersing member, like a traditional washer. Thus, the configuration, shape and materials used for the dispersion plate 420, as well as the coupling member 400 can prolong the amount of time it will take for the basket 100 to reach its critical temperature or melting point.

Since the poke-through 10 is placed below floor level, the bottom of the coupling shaft 406 reaches the highest temperature during a fire. The long shank of the preferably stainless steel screw 402 transfers heat to the top portion, primarily by conduction, passing through the thermal barrier 200. Thus, the temperature at the head 404 is transferred (again mainly by conduction) to the supporting structure. In this embodiment, by providing a contact surface 132 with a smaller surface area than the downwardly facing undersurface of the head 404, heat conduction from the coupling member 400 to the basket 100 is reduced. Additionally, providing additional portions of the coupling member 400, particularly its undersurface, that do not directly engage either the coupling mount 120 or the basket 100, promotes convective cooling.

The dispersion plate 420 shown in FIGS. 2 and 4a, as well as the additional plate 430 shown in FIG. 4b, are in the form of an annular washer. However, other shapes and sizes for these plates could alternatively be used. It should be understood that while the dispersion plate 420 is shown to be separate from the shaft 402 and/or head 404, the two elements could be integrally formed or joined together chemically or mechanically. Preferably, the dispersion plate 420 is also stainless steel, however other materials such as ceramics, plastics or heat resistant fibers could be used. The dispersion plate 420 material is preferably selected for its low thermal conductivity, strong durability and/or low cost. Additional washer 430 is preferably a heat resistant material, such as ceramic fiber, and used in combination with a stainless steel dispersion plate 420.

Preferably the washer 430 provides an additional thermal barrier for the convective heat transfer in the poke-through assembly. Washer 430 is preferably made of a heat resistant material such as a refractory ceramic fiber, for example NUTEC FIBRATEC®, FIBERFAX®, CERWOOL®, KAOWOOL® and others. Such materials can typically be manufactured in a paper or pad form which can be cut into almost any shape, is light weight, relatively inexpensive and particularly suited for this application. For example, such materials can typically withstand temperatures of 2000° F. to 3000° F. and can certainly function well as at least a temporary thermal barrier. By resisting conductive heat transfer directly between the coupling member 400 and the basket 100, the upper portions of the poke-through 10 will not heat as quickly. The washer 430 can be made up entirely of refractory ceramic fibers or can have a layered configuration such that the ceramic paper is included as one or more of the substrate layers. Alternatively, all or a portion of the washer 430 can include other materials. As a further alternative, portions of washer 430 could either include gaps in the ceramic material or simply be reinforced by separate areas of ceramic material.

Figures 5, 6:
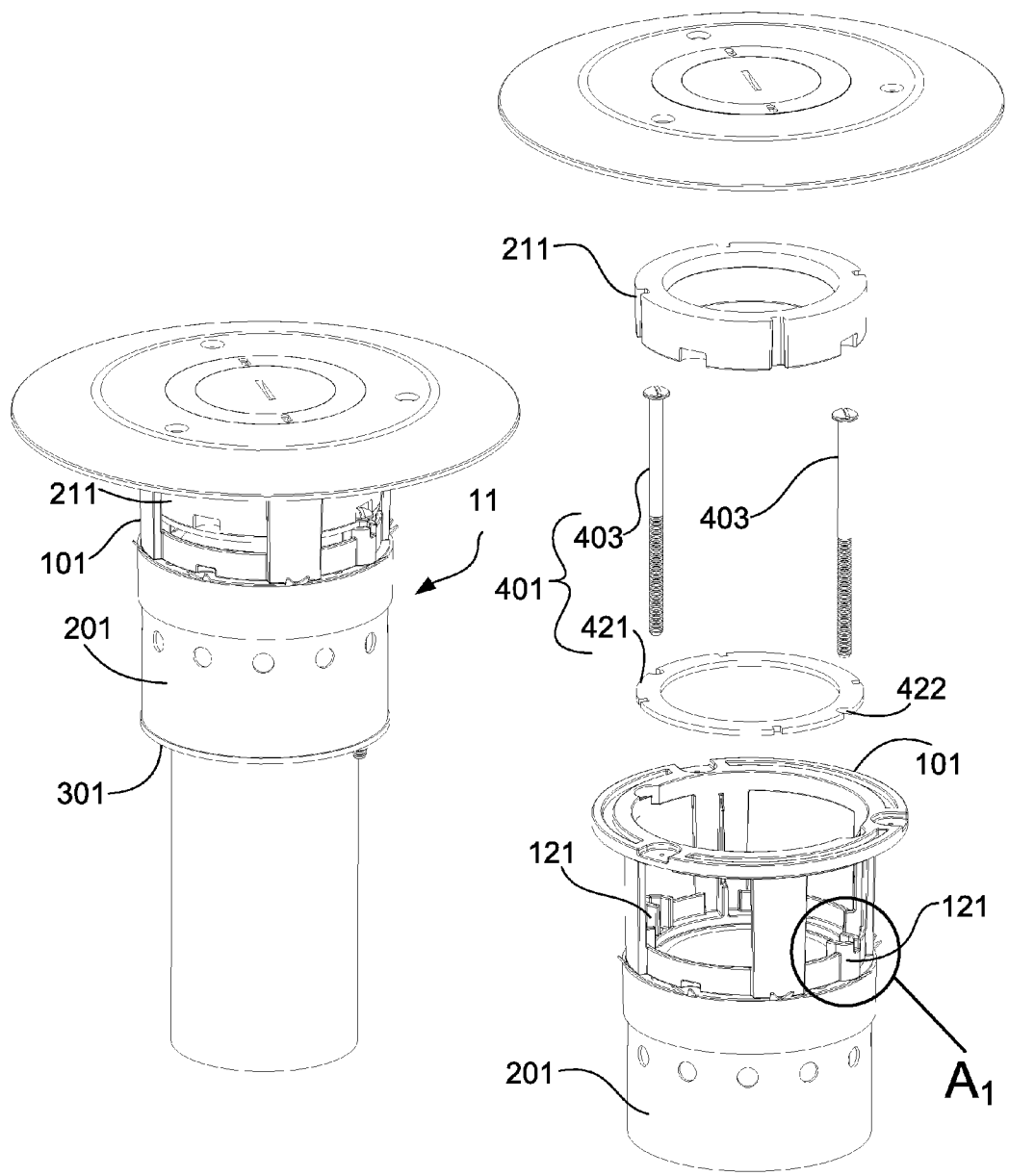
FIG. 5 is a top perspective assembled view of a second embodiment of the poke-through assembly of the present invention with a cover assembly and conduit structures.
FIG. 6 is a top partially exploded perspective view of the poke-through assembly and cover assembly shown in FIG. 5, without the lower assembly.

FIGS. 5 and 6 show an alternative design for the poke-through devices 11. As shown, the poke-through 11 preferably includes a basket 101, a thermal barrier 201 and a lower end plate 301. Also shown are portions of the alternative stand-off coupling mounts 121 and a modified upper thermal barrier 211. The exploded view in FIG. 6 shows some additional elements of the assembly in FIG. 5. In particular, the basket 101 is shown unobstructed with a coupling member 401 separated there from. Also, more clearly shown in FIG. 6 are two alternative stand-off coupling mounts 121, preferably secured to a lower portion of the basket 101. While two mounts 121 are shown, it should be understood that additional mounts could be included. Ultimately, the mounts 121 need to support the coupling member 401, while minimizing contact surfaces. Also shown is an alternative dispersion plate 421, which is significantly larger than the earlier version. The alternative dispersion plate 421 is sized to accommodate an inner diameter of the basket 101. In this embodiment the basket 101 is designed with stabilizing features such as protruding ribs that mate with indents on the alternative dispersion plate 421. Also, the coupling member shaft 403 is made to pass through a notch 422. It should be understood that the alternative dispersion plate 421 could be made to have a circular aperture, rather than just a notch. Additionally, the same design considerations mentioned above are preferably used when selecting materials for the plate 421.

Figure 7:
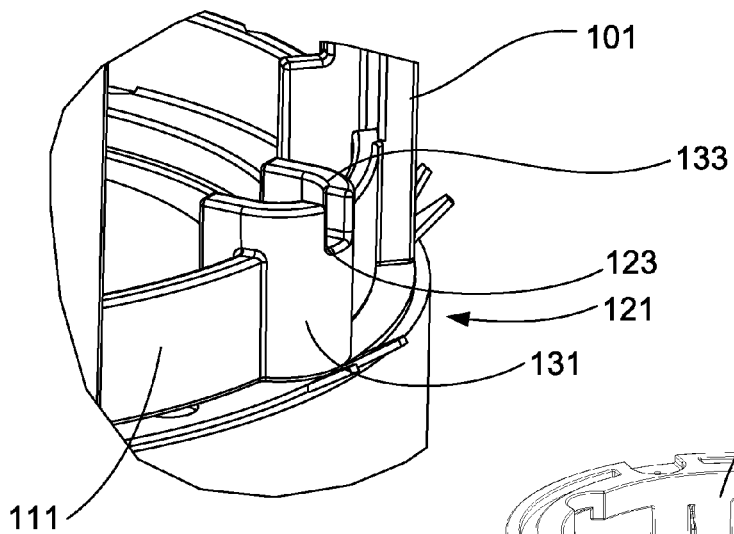
FIG. 7 is a top perspective relief view of an alternative stand-off coupling mount shown at $A_1$ in FIG. 6.
Figure 8:
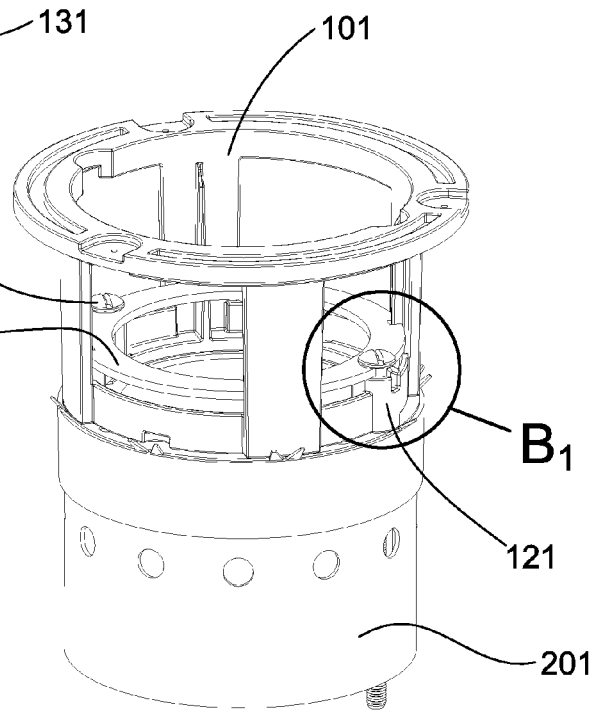
FIG. 8 is a top perspective view of the lower portions of the poke-through assembly shown in FIG. 6, assembled with screws and a dispersion ring.
Figure 9:
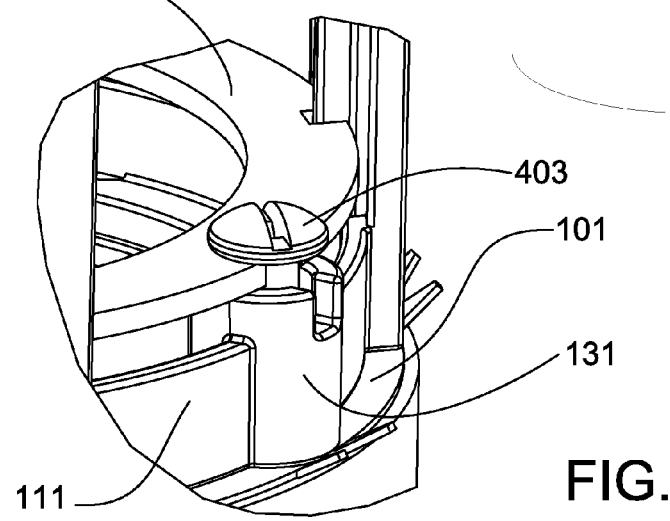
FIG. 9 is a top perspective relief view of the alternative stand-off coupling mount, as shown at $B_1$ in FIG. 8.

FIGS. 7-9 show even further details of the alternative poke-through 11. In particular, FIG. 7 shows details of an alternative stand-off coupling mount 121 as shown at $A_1$ in FIG. 6. The stand-off support structure 131 has a more cylindrical form and is incorporated around a lower structure 111 of the basket 101. As with the previous embodiment, contact surface 133 is located at the top of the support structure 131, with notches or gaps 123 in the lower structure 111 creating open spaces to minimize the thermal transfer surfaces and promote convective cooling. FIG. 9 shows details shown at $B_1$ in FIG. 8. In particular FIG. 9 shows how plate 421 sits on top of the contact surface 133 and is secured to the coupling member head 403. As with the first embodiment, this additional embodiment includes heat isolation features that serve to increase the amount of time for the conductive heat transfer process to take place in the support frame while reducing its temperature by convectional cooling in order to help meet regional testing requirements. Also, as with the earlier embodiments, an additional ceramic fiber washer or dispersion plate 430 can be used between dispersion plate 421 and the support structure 131.

Although illustrative embodiments of the present invention have been described herein with reference to the accompanying drawings, it is to be understood that the invention is not limited to those precise embodiments, and that various other changes and modifications may be applied therein by one skilled in the art without departing from the scope or spirit of the invention.

What is claimed is:

1. A poke-through device for installation in a hole in a floor structure, the floor structure defining a floor in a first working environment and a ceiling in a second working environment, the poke-through device comprising:
   a basket, a lower structure of the basket including a coupling standoff mount having a support structure, the standoff mount having a contact surface located generally at the top of the support structure and a gap in the support structure for minimizing thermal transfer between at least one coupling member and the basket;
   an intumescent member disposed below the basket;
   a lower plate supporting the intumescent member; and
   the at least one coupling member extending through the intumescent member and securing the basket to the lower plate, wherein a first portion of the coupling member is in direct engagement with the contact surface and a second portion of the coupling member extends across the gap.

2. The poke-through device as set forth in claim 1, wherein the coupling member includes a head on at least one end and a dispersion plate disposed between the head and the contact surface.

3. The poke-through device as set forth in claim 2, wherein the dispersion plate is formed of a ceramic-fiber washer.

4. The poke-through device as set forth in claim 3, wherein the standoff mount includes a tab for holding the dispersion plate in a pre-selected position.

5. The poke-through device as set forth in claim 2, wherein the basket includes ribs that interlock with the dispersion plate for positioning the dispersion plate in relation to the basket.

6. The poke-through device as set forth in claim 1, wherein the coupling standoff mount integrally formed with the basket.

7. The poke-through device as set forth in claim 6, wherein the standoff mount protrudes upwardly from the lower structure toward the first working environment.

8. The poke-through device as set forth in claim 6, wherein the standoff mount protrudes inwardly from an outer portion of the basket.

9. The poke-through device as set forth in claim 1, further comprising an additional intumescent member disposed at least partially above the coupling member.

10. The poke-through device as set forth in claim 1, wherein the dispersion plate is an annular washer.

11. The poke-through device as set forth in claim 1, wherein the dispersion plate is sized to conform to at least a portion of an inner peripheral surface of the basket.

12. A poke-through device for installation in a hole in a floor structure, the floor structure defining a floor in a first working environment and a ceiling in a second working environment, the hole communicating between the first and second working environments, the poke-through device comprising:
- a receptacle-receiving basket, the basket including a lower structure having a coupling standoff mount, the standoff mount having a support structure including a contact surface generally at the top of the support structure and at least one gap in the support structure minimizing thermal transfer between at least one fastener assembly and the basket;
- an intumescent member disposed below the basket;
- a base member for supporting the intumescent member; and
- the at least one fastener assembly extending through the intumescent member and securing the intumescent member between the basket and the base member, wherein a first portion of the fastener assembly is in direct engagement with the contact surface and a second portion of the fastener assembly extends across the gap.

13. The poke-through device as set forth in claim 12, wherein the fastener assembly includes a bolt having a head and a dispersion plate disposed between the head and the contact surface.

14. The poke-through device as set forth in claim 13, wherein the standoff mount includes a tab for holding the dispersion plate in a pre-selected position.

15. The poke-through device as set forth in claim 13, wherein the basket includes ribs that interlock with the dispersion plate for positioning the dispersion plate in relation to the basket.

16. The poke-through device as set forth in claim 12, wherein the standoff mount includes an upper surface for engaging the fastener assembly first portion.

17. The poke-through device as set forth in claim 16, wherein the standoff mount protrudes upwardly toward the first working environment from the lower structure.

18. The poke-through device as set forth in claim 16, wherein the standoff mount protrudes inwardly from an outer portion of the basket.

19. The poke-through device as set forth in claim 12, further comprising an additional intumescent member disposed at least partially above the fastener assembly.

20. The poke-through device as set forth in claim 12, wherein the dispersion plate is an annular member.

* * * * *